Dec. 24, 1929.  A. O. AUSTIN  1,740,642
INSULATOR
Filed Dec. 9, 1927

Witness:
H. J. Stromberger

Inventor
ARTHUR O. AUSTIN
By
Attorney

Patented Dec. 24, 1929

1,740,642

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATOR

Application filed December 9, 1927. Serial No. 238,916.

My invention relates to insulating supports and particularly to supports for electric conductors or bus bars.

The object of my invention is to provide a support to insulate the conductor from the ground, and also to grip the conductor, and further to have its gripping mechanism adjustable with respect to the conductor and the other parts of the support.

My invention resides in a new and novel construction, combination and relation of the various parts hereinafter fully disclosed and shown in the drawing accompanying this specification.

Figure 1:
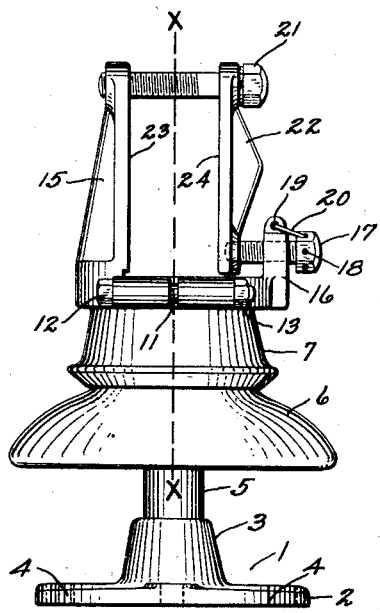
Fig. 1 is a side view in elevation of my invention.
Figure 2:
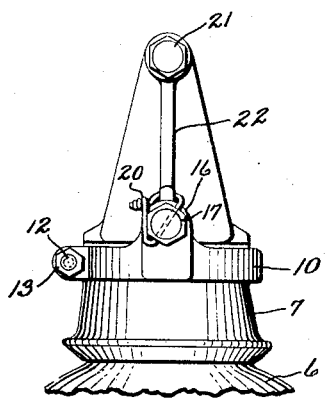
Fig. 2 is another side view of the cap portion and gripping mechanism only.
Figure 4:
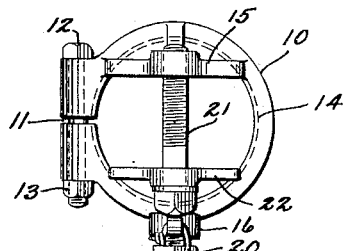
Fig. 4 is a top view of the cap and gripping mechanism shown in Fig. 1.
Figure 3:
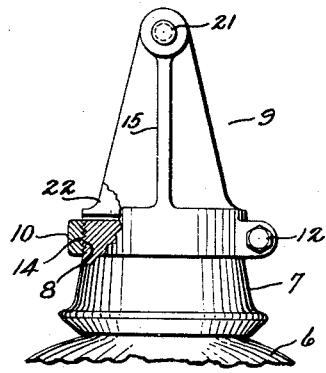
Fig. 3 is another side view of Fig. 1 showing the cap and gripping mechanism only, and is the opposite side to that shown in Fig. 2.

In the preferred embodiment of my invention I employ a base member 1 provided with a base flange 2 and a receptacle portion 3. The base flange 2 is provided with openings 4 by means of which the base is fastened to a support. Projecting from the base 1 is a stem 5 which is secured in the receptacle 3 as by screw threading, welding or pinning, or other well known means. Mounted on the pin 5 is an insulating member 6, preferably of porcelain and which may be composed of one or more parts.

Mounted upon the insulating member 6 is a cap 7 of an inverted cup-shaped formation. This cap is secured to the insulator preferably by means of cement. The member 6 forms an insulating element between the members 5 and 7. The upper end of the member 7 is provided with a screw thread 8. Mounted upon the threaded end of the cap 7 is the clamping mechanism 9 comprising a ring portion 10, which is provided with a slot 11 upon one side and which can be adjusted by means of the bolt and nut 12 and 13 respectively. The inner surface of the ring is screw threaded, as at 14, to cooperate with the threads 8 and interlock therewith, and these threads cooperate to adjust the height of the mechanism 9 with respect to the base member 1, and also permit angular adjustment of the clamping mechanism with respect to the support and can be secured in a predetermined position by means of the bolt and nut 12 and 13.

Mounted upon the member 10 is an upright, stationary clamping member 15 integrally united at its base with the member 10. Integrally secured to the member 10, diametrically opposite from that of the clamping member 15 is a supporting lug 16 having an internally threaded passage therethrough to receive the cap screw 17. The cap screw 17 and the support member 16 are provided with holes 18 and 19 respectively, through which may be passed a lock or sealing wire 20. The free end of the clamping member 15 is provided with an internally threaded passage therethrough to receive the cap screw 21, which is preferably free of threads adjacent the head. Slidably and rotatably mounted upon the cap screw 21 is an adjustable clamping member 22, movable toward and away from the fixed clamping member 15, whereby the faces 23 and 24 of the clamping members may be moved toward or away from each other so as to grip or release a conductor or bus bar held therebetween.

The lower end of the member 22 is arranged to engage the end of the cap screw 17 whereby the rotation of the cap screw 17 in one direction will tend to move the lower end of the member 22 toward the member 15. The rotation of the member 21 in the right direction will move the upper end of the member 22 toward the member 15. The screw 21 acts under tension in clamping the conductor between the members 15 and 22 and the screw 17 acts in compression.

With proper attention given to designing the device with respect to the arrangement and spacing of the clamping mechanism, it is possible to arrange the parts such that complete disassembly is not necessary in order to position the conductor in between the members 15 and 22, as for instance, in such case it is only necessary to back off the screw 17 and to rotate the member 22 about the screw 21, in which case the lower end of the member 22 may become the upper end, and this will leave sufficient space between the bolt 21 and the support member 16 for the conductor to be placed in position. Of course, if desired, the bolt 21 can always be removed and with it the clamping member 22. It will be noted that having the base formation 2 in position, the member 10, together with the clamping members 15 and 21, can be rotated upon the member 7 thereby raising or lowering the upper surface of the member 10 above or below the upper surface of the cap 7, which will adjust the height of the support for the conductor with respect to the base 1, also the rotation of the member 10 upon the cap 7 permits angular adjustment of the space between the clamping members 15 and 22 with respect to the vertical axis $x$—$x$. It should also be noted that the space between the faces 23 and 24 of the clamping members is adjustable to receive conductors of varying widths. My device is adjustable as to height and the size of conductor which it will grip, and also as to alinement with respect to the vertical axis $x$—$x$.

Modifications, of course, will suggest themselves to those skilled in the art, but I wish to be limited only by my claims.

I claim:

1. A bus bar support comprising a base, an insulator mounted on said base, a metallic fitting fixed to said insulator, said fitting having an externally threaded portion, an internally threaded split ring engaging the threaded portion of said fitting, means for clamping the portions of said split ring tightly upon the threaded portion of said fitting to hold said ring in fixed position on said fitting, and means carried by said split ring for clamping a bus bar thereto.

2. A bus bar support comprising a base, an insulator mounted on said base, a metal cap fixed to said insulator, said cap having an upper portion thereof externally threaded, a split metal ring engaging the threaded portion of said cap, a screw for clamping said ring upon said cap to hold said ring firmly in various adjusted positions on said cap, an upright jaw formed on said ring and having an upright clamping face, a movable jaw, and threaded means for clamping said movable jaw against a bus bar disposed above said ring and against the clamping face of said first named jaw.

In testimony whereof I affix my signature.

ARTHUR O. AUSTIN.